US012393680B2

(12) United States Patent
Parinov et al.

(10) Patent No.: US 12,393,680 B2
(45) Date of Patent: Aug. 19, 2025

(54) SYSTEM AND METHOD OF DETECTING AN UNAPPROVED USE OF A COMPUTING DEVICE OF A USER

(71) Applicant: AO Kaspersky Lab, Moscow (RU)

(72) Inventors: Denis I. Parinov, Moscow (RU);
Dmitry V. Vinogradov, Moscow (RU);
Victoria V. Vlasova, Moscow (RU);
Vasily A. Davydov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 36 days.

(21) Appl. No.: 17/211,341

(22) Filed: Mar. 24, 2021

(65) Prior Publication Data
US 2021/0397701 A1 Dec. 23, 2021

(30) Foreign Application Priority Data
Jun. 19, 2020 (RU) .......................... RU2020120452

(51) Int. Cl.
*G06F 21/55* (2013.01)
(52) U.S. Cl.
CPC ...... *G06F 21/552* (2013.01); *G06F 2221/034* (2013.01)
(58) Field of Classification Search
CPC .................. G06F 21/552; G06F 2221/034
See application file for complete search history.

(56) References Cited

U.S. PATENT DOCUMENTS

| | | | |
|---|---|---|---|
| 9,158,605 B2 | 10/2015 | Mishra et al. | |
| 10,599,834 B1* | 3/2020 | Stoletny | H04L 63/1466 |
| 2009/0222877 A1* | 9/2009 | Diehl | H04L 63/1416 726/1 |
| 2014/0331119 A1* | 11/2014 | Dixon | G06F 21/567 715/234 |
| 2016/0337384 A1* | 11/2016 | Jansson | H04L 65/1045 |
| 2016/0352763 A1* | 12/2016 | Zou | H04L 63/1425 |
| 2018/0069878 A1* | 3/2018 | Martini | H04L 67/02 |

(Continued)

OTHER PUBLICATIONS

Rashid et al. "The browsers strike back: countering cryptojacking and parasitic miners on the web." IEEE Conference on Computer Communications. Apr. 29, 2019. p. 703-711. (Year: 2019).*

(Continued)

*Primary Examiner* — Carl G Colin
*Assistant Examiner* — Zhe Liu
(74) *Attorney, Agent, or Firm* — ArentFox Schiff LLP; Michael Fainberg

(57) ABSTRACT

Disclosed herein are systems and methods for detecting an unapproved use of a computing device of a user. In one aspect, an exemplary method comprises, by a security application: detecting a script executing in a browser on the computing device of the user, intercepting messages being exchanged during an interaction of the script with a server, wherein the intercepted messages comprise at least one of messages sent from the script to the server and from the server to the script, analyzing the intercepted messages to determine whether or not attributes of an unapproved use of resources of the computing device of the user are present, detecting the unapproved use of the resources of the computing device of the user when at least one of said attributes is detected.

16 Claims, 4 Drawing Sheets

(56) References Cited

U.S. PATENT DOCUMENTS

| | | | | |
|---|---|---|---|---|
| 2018/0302781 | A1* | 10/2018 | Lee | H04W 12/069 |
| 2019/0364057 | A1* | 11/2019 | Hazay | H04L 63/1425 |
| 2020/0004961 | A1* | 1/2020 | Prokudin | G06F 21/567 |
| 2020/0034530 | A1* | 1/2020 | Zasadzinski | G06F 21/554 |
| 2020/0084225 | A1* | 3/2020 | McKendall | G06F 21/54 |
| 2020/0137084 | A1* | 4/2020 | Roy | H04L 63/1416 |
| 2020/0351300 | A1* | 11/2020 | Kaidi | G06F 16/986 |
| 2020/0364338 | A1* | 11/2020 | Ducau | G06F 21/564 |
| 2020/0387597 | A1* | 12/2020 | Karasev | G06F 21/566 |
| 2021/0019412 | A1* | 1/2021 | Hewlett, II | G06F 21/565 |
| 2021/0064749 | A1* | 3/2021 | Weizman | G06F 21/561 |
| 2021/0097186 | A1* | 4/2021 | Mandal | G06F 21/554 |
| 2021/0258791 | A1* | 8/2021 | Jochem Sanz | H04W 12/66 |
| 2022/0377109 | A1* | 11/2022 | Kallos | G06F 21/566 |

OTHER PUBLICATIONS

Kharraz et al. "Outguard: Detecting in-browser Covert Cryptocurrency Mining in the Wild." Proceedings of the 2019 World Wide Web Conference. May 2019. p. 840-852 (Year: 2019).*

Rauchberger et al. "The other side of the coin: A framework for detecting and analyzing web-based cryptocurrency mining campaigns." Proceedings of the 13th International Conference on Availability, Reliability and Security. 2018. p. 1-10. (Year: 2018).*

Tung, Liam, "Windows: This sneaky cryptominer hides behind taskbar even after you exit browser", Article [online], ZDNET, 2017 [retrieved on Nov. 29, 2023], Retrieved from the Internet: <URL: https://www.zdnet.com/article/windows-this-sneaky-cryptominer-hides-behind-taskbar-even-after-you-exit-browser/> (Year: 2017).*

Segura, Jérôme, "Persistent drive-by cryptomining coming to a browser near you", Article [online], Malwarebytes Labs, Nov. 29, 2017 [retrieved on May 31, 2024], from the Internet: <URL: https://www.malwarebytes.com/blog/news/2017/11/persistent-drive-by-cryptomining-coming-to-a-browser-near-you/> (Year: 2017).*

Papadopoulos et al., "Master of web puppets: Abusing web browsers for persistent and stealthy computation," arXiv preprint arXiv:1810.00464, 2018, p. 1-16 (Year: 2018).*

Calderbank, Brett, "The injected coinhive iframe." Manchester Grey Hats Blog [online], Jan. 15, 2018 [retrieved on Jun. 17, 2025]. Retrieved from the Internet <URL: https://blog.manchestergreyhats.co.uk/posts/the-injected-coinhive-iframe---a-quick-look/> (Year: 2018).*

Saad et al., "Dine and dash: Static, dynamic, and economic analysis of in-browser cryptojacking." 2019 APWG Symposium on Electronic Crime Research (eCrime). Nov. 2019, p. 1-12 (Year: 2019).*

Saad et al., "Analyzing In-Browser Cryptojacking." IEEE Transactions on Dependable and Secure Computing, vol. 21. Mar. 2024, p. 5448-5460 (Year: 2024).*

* cited by examiner

SYSTEM AND METHOD OF DETECTING AN UNAPPROVED USE OF A COMPUTING DEVICE OF A USER

CROSS REFERENCE TO RELATED APPLICATIONS

The present application claims priority to Russian Patent Application No. 2020120452, filed on Jun. 19, 2020, the entire content of which is incorporated herein by reference.

FIELD OF TECHNOLOGY

The present disclosure relates to the field of detecting malicious activity on a computing device of a user. Specifically, to systems and method for detecting unapproved use of a computing device, e.g., detecting mining of cryptocurrency using a browser on the computing device of the user. The mining of the cryptocurrency is performed without the knowledge of the user of the computing device.

BACKGROUND

At present, the amount of malicious software is growing (such as computer viruses, Trojan horses, Internet worms). The malicious software is designed to cause harm to both the data of a user and to the actual user of the electronic computing device (hereinafter, the computing device which is infected with the malicious software). The harm may be caused by damaging, modifying or deleting files of the user, stealing confidential data of the user (correspondence, media data such as pictures, audio recordings, etc., logins, passwords, bank card data), using the resources of the computing device of the user for the "mining" of electronic money or, in other words, cryptocurrency, and other actions.

A scheme of mining cryptocurrency using browsing software (browsers) has become widespread. In many cases, such mining is performed hidden from the user and, as a rule, using malicious scripts written using a text based programming language, e.g., JavaScript. A key attribute is the massive use of Web Socket/WebSocketSecured (WS/WSS) protocols to enable an interaction of the script on the client and the server in the mining process. WS/WSS protocols are used significantly less often on the Internet than ordinary HTTP/HTTPS protocols and are distinguished in that, after the connection is established, there is a constant exchange of messages. Such an exchange of messages by using a browser is legitimate in terms of security, since it does not cause harm to the user's (integrity and confidentiality) data stored on the device. However, a mining of cryptocurrency is not detected when performed using exchanges of messages via the same browser.

Thus, there is a need for a more optimal and effective way of detecting unapproved uses, such as mining of cryptocurrency, wherein the unapproved use (e.g., the mining of cryptocurrency) occurs using a browser software on the computer device of the user.

SUMMARY

Aspects of the disclosure relate to anonymization of data, more specifically, to systems and methods for detecting an unapproved use of a computing device of a user, e.g., mining cryptocurrency using a browser on the computing device of the user without the knowledge of the user.

In one exemplary aspect, a method is provided for detecting an unapproved use of a computing device of a user, the method comprising: by a security application, detecting a script executing in a browser on the computing device of the user, intercepting messages being exchanged during an interaction of the script with a server, wherein the intercepted messages comprise at least one of messages sent from the script to the server and from the server to the script, analyzing the intercepted messages to determine whether or not attributes of an unapproved use of resources of the computing device of the user are present, detecting the unapproved use of the resources of the computing device of the user when at least one of said attributes is detected.

In one aspect, the method further comprises: analyzing, by the security application, the script, wherein the detection of the unapproved use of the resources is further based on the analysis of the script.

In one aspect, the unapproved use of the resources of the computing device of the user comprises using, by the script, the resources of the computing device for mining of cryptocurrency.

In one aspect, the attribute of the unapproved use of the resources of the computing device of the user comprises at least one of: an attribute associated with the script obtaining an obfuscated code; an attribute associated with the script obtaining a code in a BASE64 format; an attribute based on a content of a website opened using the browser, wherein the opening of the websites resulted in the execution of the script; an attribute based on a predetermined sequence of bytes or strings being detected in the intercepted messages; an attribute based on a category of the external server from which the script received the obfuscated code; and an attribute based on a category of a website opened using the browser, wherein the opening of the website resulted in the execution of the script.

In one aspect, the category of the website is obtained from a cloud network based security service.

In one aspect, the script being executed in the browser is detected using a plugin.

In one aspect, the intercepted messages comprise messages that are exchanged in accordance with a communication protocol over a TCP connection.

According to one aspect of the disclosure, a system is provided for detecting an unapproved use of a computing device of a user, the system comprising a hardware processor configured to: detect a script executing in a browser on the computing device of the user, intercept messages being exchanged during an interaction of the script with a server, wherein the intercepted messages comprise at least one of messages sent from the script to the server and from the server to the script, analyze the intercepted messages to determine whether or not attributes of an unapproved use of resources of the computing device of the user are present, detect the unapproved use of the resources of the computing device of the user when at least one of said attributes is detected.

In one exemplary aspect, a non-transitory computer-readable medium is provided storing a set of instructions thereon for detecting an unapproved use of a computing device of a user, wherein the set of instructions comprises instructions for: detecting a script executing in a browser on the computing device of the user, intercepting messages being exchanged during an interaction of the script with a server, wherein the intercepted messages comprise at least one of messages sent from the script to the server and from the server to the script, analyzing the intercepted messages to determine whether or not attributes of an unapproved use of resources of the computing device of the user are present, detecting the unapproved use of the resources of the computing device of the user when at least one of said attributes is detected.

The method and system of the present disclosure are designed to provide data security, e.g., cryptocurrency information.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for detecting unapproved use of a computing device in accordance with aspects of the present disclosure. For instance, the method of the present disclosure may be used for detecting when mining of cryptocurrency occurs using a browser software installed in the computing device of the user. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
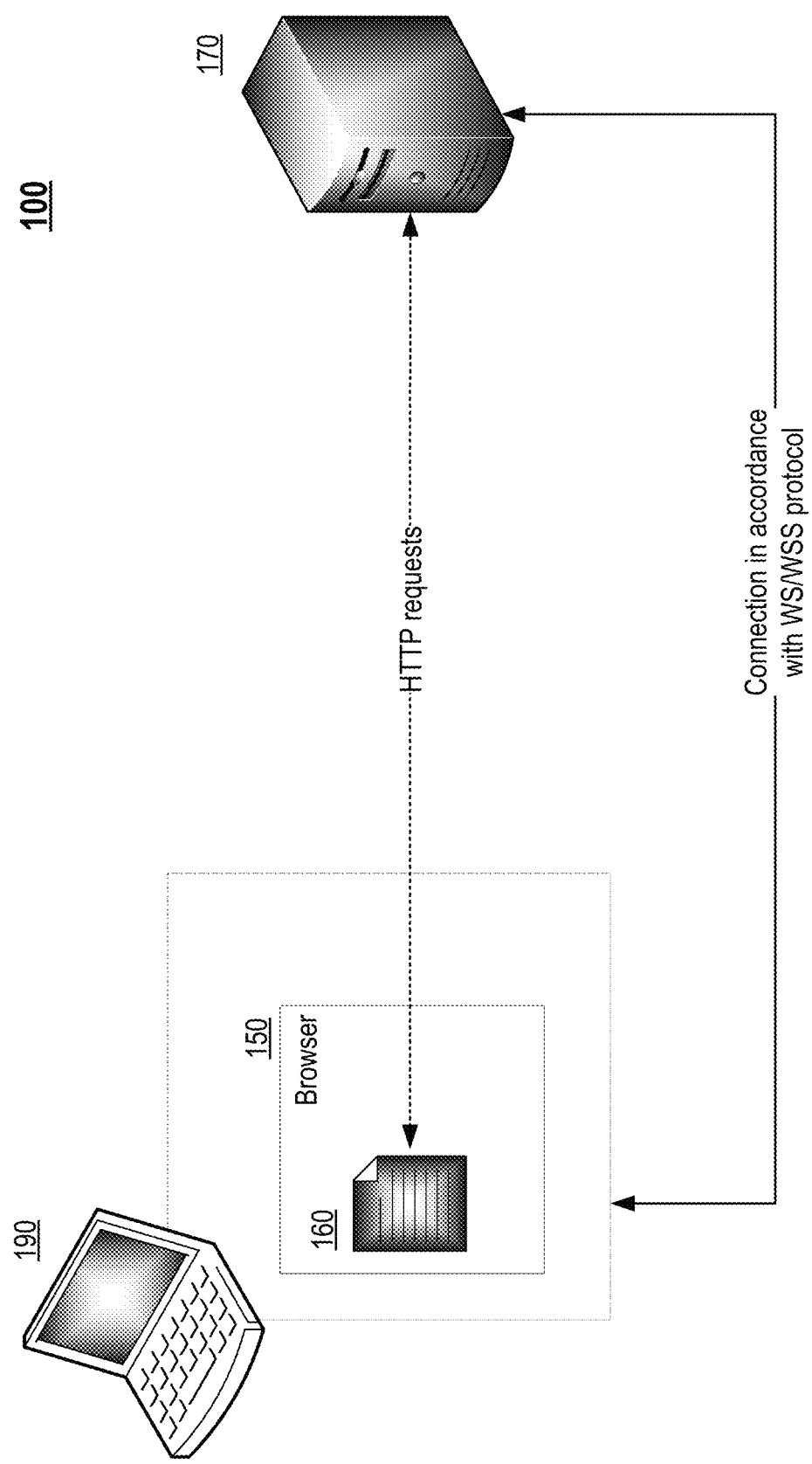
FIG. 1 illustrates a scheme for mining of cryptocurrency using a web browser.

FIG. 1 illustrates a scheme 100 for mining of cryptocurrency using a browser. In scheme 100, a browser 150 is implemented on the computing device 190 of the user. In the majority of instances, upon going to a site on the Internet which has been infected or was originally malicious, the browser 150 downloads, from a network, a script 160 which is designed for an unapproved use of the resources of the computing device 190 of the user. The use of the resources of the computing device 190 of the user occurs without the knowledge or consent of the user, that is, it is unapproved. In one aspect, the downloaded script 160 is not designed for directly performing the unapproved use of the resources of the computing device 190 of the user. Rather, the downloaded script 160 is designed to generate another script 160 which is designed for the unapproved use of the resources of the computing device 190 of the user. For example, the script 160 may do nothing more than regularly download from the network and launch other scripts 160. A known example of the unapproved use of the resources of the computing device 190 of the user is a script for mining cryptocurrency while hidden from the user.

For ease of understanding, in the description provided below, the term "mining of cryptocurrency" is used to refer to examples of unapproved uses of the resources of the computing device 190 of the user. However, the term is not intended to limit the implementation only to cryptocurrency related applications. Thus, the method of the disclosure may be used for other applications in which the user's device is used in a manner that is not approved by the user and hence the activity occurs using browser software that is installed for a legitimate purpose.

In one aspect, the script 160 is created (written) in a script programming language, such as in JavaScript. In one aspect, the script 160 is executed in the browser 150, and interacts with a particular Internet resource, such as a server 170, wherein the interaction comprises sending data to the server 170 and receiving data from the server 170.

In the event that the interaction is successful (for example, if the connection is established and the script 160 receives responses from the server 170), the script 160 initiates a connection with the server 170 in accordance with a communication protocol over a TCP connection, which is designed to exchange messages between the browser 150 and the server 170 in a real time mode (for example, WebSocket or WebSocketSecure, WS/WSS). Then, an uninterrupted exchanging of messages occurs. During the exchange of messages, the server 170 can send tasks in the messages. The tasks are characteristic of the mining of cryptocurrency (such as tasks for the computing of hashes). Then, the script 160, using the resources of the computing device 190 of the user, performs the tasks sent by the server 170 (for example, the script 160 may perform said computing of hashes). In performing these tasks, the browser 150 in no way notifies the user, and therefore such mining of cryptocurrency is covert or hidden from the user. Often, as a result of these hidden activities, the computing device 190 of the user slows down its own operation (especially in cases when the computing device 190 of the user has a central processor with one or two kernels or RAM memory with a capacity under four gigabytes). The user may be affected as a result of the slowing down of the normal operations of the computing device 190. For instance, the user may suffer financial losses (due to the electricity bills increasing as a result of the computing device running for longer time to do the same normal operations).

In one aspect, the present disclosure describes a system for detecting mining of cryptocurrency using a browser software in accordance with aspects of the present disclosure. The system 200 (described below) is implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

The method of the present disclosure enables detection of mining of cryptocurrency, e.g., mining of the cryptocurrency performed via a browser.

Figure 2:
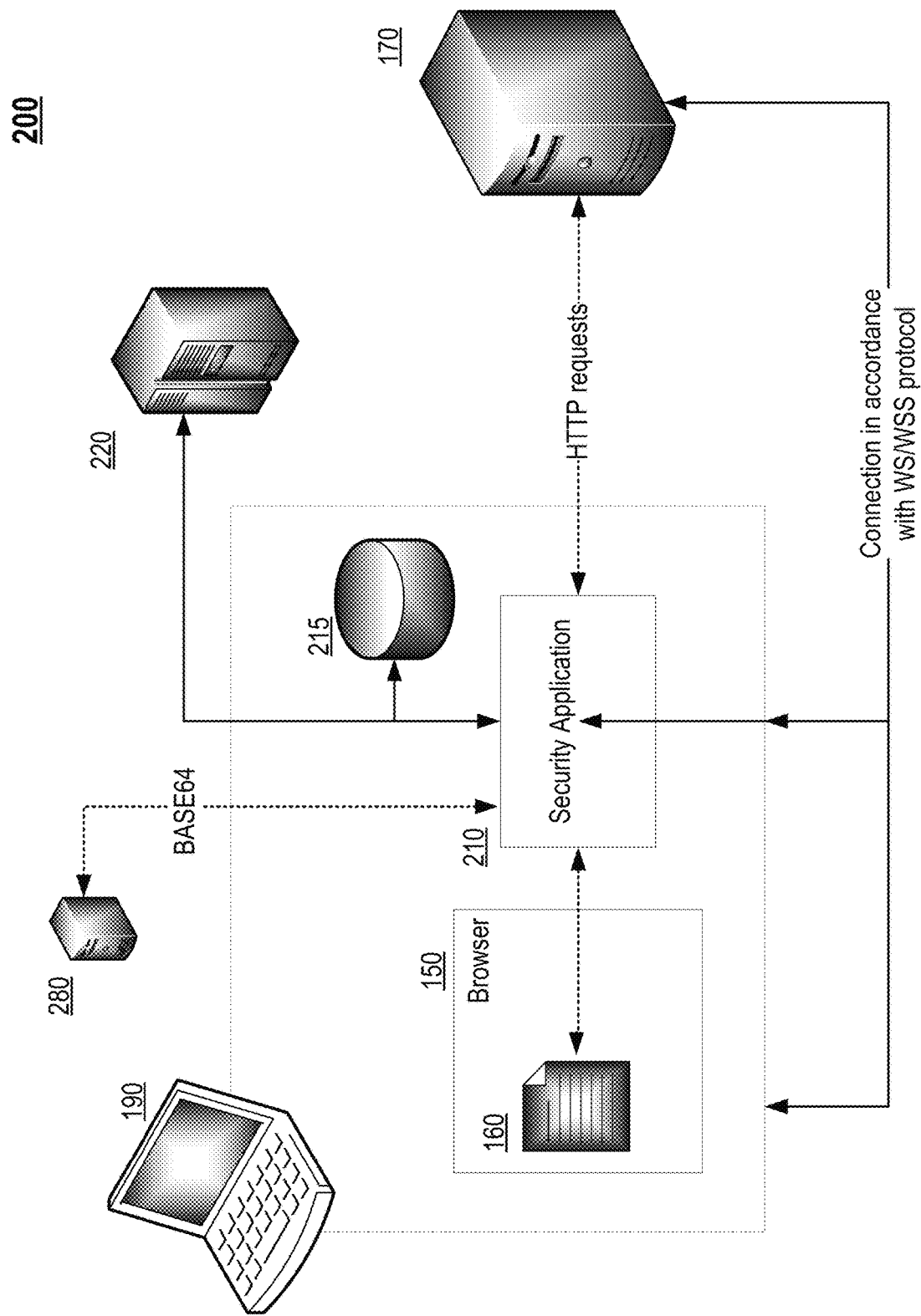
FIG. 2 illustrates a system for detecting an unapproved use of a computing device.

FIG. 2 illustrates a system 200 for detecting mining of cryptocurrency using a browser software in accordance with aspects of the present disclosure. The system 200 includes of a security application 210 (such as an antivirus application) and a cloud security service 220 (such as a security service provided by a Kaspersky Security Network). "Cloud security service" is used to refer to a network security service provided via a cloud network.

In one aspect, the security application 210 is installed on the computing device 190 of the user. In one aspect, a browser 150 is installed on the computing device 190. In turn, a script 160 is instantiated in the browser 150.

For the detection of the unapproved use of the resources of the computing device 190 of the user (such as the mining of cryptocurrency), the security application 210 analyzes the operations of at least one process of the browser 150. In one aspect, the analysis of the operations includes intercepting messages for performing actions of the process of the browser 150 (with the aid of drivers). Moreover, the security application 210 detects that a script 160 is being executed in the browser. In one aspect, the detection of the script 160 that is being executed in the browser comprises: installing, by the security application 210, a plugin of the security application 210 in the browser 150, and determining that a connection has been established in accordance with a communication protocol over TCP connection (for example, in accordance with the WebSocket protocol). For example, the plugin may be used to determine that the connection has been established over the TCP connection. In one aspect, the determination of the establishment of the connection includes: intercepting, by the security application 210, messages that are exchanged between the script 160 and the server 170. Thus, the security application 210 intercepts the messages being sent in either direction by the protocol (to the script 160 or to the server 170).

In one aspect, the interception of the messages may be performed by the security application 210 using the plugin described in the example above.

In another aspect, the interception of the messages may be performed by the security application 210, e.g., with the aid of a driver.

In one aspect, if a secure protocol for communication over a TCP connection is being used (such as in accordance with the WebSocketSecure protocol), the security application 210 additionally decrypts each message.

In one aspect, the security application 210 performs the intercepting of messages by functioning as a proxy server.

After the intercepting and decrypting of a message, the security application 210 analyzes the intercepted message for the presence of attributes that enable a connection, by a communication protocol over TCP connection, to be assigned for an unapproved use, e.g., to mining of cryptocurrency.

In one aspect, the intercepted message is analyzed to identify an attribute that comprises a certain sequence of bytes (and/or strings) in the message, such as:

"'job_id":'
"'currentJob":'
"'hextarget":'
"'blob":'
"'jsonrpc":"2.0","method":"sign'.

In another aspect, the attribute comprises a code obtained, by the script 160, in a BASE64 format. For example, the script 160, when executed in the browser 150, additionally downloads a certain code (in BASE64 format) from an external server 280 for execution thereof.

In yet another aspect, the attribute comprises an obfuscated code which is obtained by the script 160. An example of such an obfuscated code is given below:

```
$=~[ ];$;(____:++$,$$$$;(![ ]+"")[$],___$:++$,$__$_:(!
[ ]+"")[$],__$__:++$,$__$$:({ }+"")[$],$$__$:($[$]+"")
[$],__$$:++$,$$$__:(!""+"")[$],$____:++$,$__$:++$,$$___:
({ }+"")[$],$$__:++$,$$$:++$,$_____:++$,$___$:++$);$,
$__=($,$__=$+"")[$,$__$]+($,__$=$,$__[$,___$])+($,$$=($,
$+"")[$,___$])+((!$)+"")[$,__$$]+($,____=$,$__[$,
$$__])+($,$=(!""+"")[$,___$])+($,__=(!""+"")[$,__
$__])+$,$__[$,$_$]+$,____+$,__$+$,$;$,$$=$,$+(!""+"")
[$,__$$]+$,____+$,_+$,$+$,$$;$,$=($,_____)[$,$__][$,$__];
$,$($,$($,$$$+"\""+$,$__$_+(![ ]+"")[$,__$_]+$,$$$__
+"\""+$,____+$,$$,__+$,__$_+$,_+"(\\\""\""+$,___$+$,__
$+$,_____+$,$$$__+(!![ ]+"")[$,__$_]+(!![ ]+"")[$,__$_]+$,__
$+"",\\""+$,$__+$,_____+""\\""+$,_____+$,$$__+$,_+$,$__$_$__
+"\""+$,____$,$$,$$__+$,$$$__+$,$_$__+"\""+$,$$,$__
+$,__$$+$,$$___+""\\""+$,___$+$,$$,$$__+$,__$_+""\\""+$,___$$,
$__$+$,_____+$+""\\""+$,_____$,$$$+$,$$_+$,_____+$,_____+""\\\""\\""+$,
$____+$,____+"")""+"\"")( ))( );
```

In one aspect, when attributes which are characteristic of mining of cryptocurrency are detected, the security application 210 blocks the sending of the intercepted messages, terminates the connection, and/or enters the address of the server 170 on a black list.

In one aspect, the security application 210 interacts with a database 215 (such as an antivirus database), containing a set of rules describing the attributes of messages used for the unapproved use, e.g., a set of rules describing attributes of messages using for mining of cryptocurrency. When analyzing a message, the security application 210 uses the set of rules from the database 215. Then, in the event that the conditions of a rule are fulfilled, an attribute having the characteristic of the mining of cryptocurrency is detected.

In one aspect, the security application 210 employs a heuristic analysis, for analyzing the usage, by the browser 150, of the central processor, the graphic processor, and the RAM memory.

In one aspect, the security application 210 additionally analyzes the source code of the scripts 160 which are used in the browser 150. In one example, to impede the analysis, the code of the script 160 may be obfuscated. In another example, the code of the script 160 may additionally send data/messages and perform actions not relating to the mining of cryptocurrency.

In another aspect, the security application 210 additionally analyzes a sequence of actions for sending the script 160 from the server 170 to the browser 150. Thus, for example, the sequence may be known, e.g., the script 160 at first receives encrypted data from a server 170, then decrypts the data. The data may contain both the operating parameters of the script 160 and other scripts 160. Moreover, in another example the script 160 may also launch an execution of another script 160 For instance, a first script may be received from a server in an encrypted form and decrypted, and the first script may then perform an execution of a second script, and so on. Thus, it is possible to detect a chain of script executions, such as: Script #1→Script #2→ . . . →Script #N. The exemplary sequence of scripts is not always malicious, since such a sequence is used, for example, by counters of Google Metrics.

In one aspect, when a website is opened using the browser 150 and the opening of the website results in an execution of the script 160, the security application 210 analyzes the website that is opened. In one aspect, the analysis of the website comprises, assessing, by the security application 210, the activity of the website (e.g., the usage, by the browser 150, of the resources of the computing device of the user after the opening of the website). For example, during normal operations of the computing device, the activity level of the website should not be constantly high (as would occur during mining of cryptocurrency). If the activity of the website is consistently high, it would be expected that the activity is due to a process initiated by certain components (such as by codecs, <video/> <embed/>). Otherwise, it may be an indication of an unauthorized activity.

In another aspect, the analysis of the website comprises, evaluating, by the security application 210, differences among activities of the website during different visits to the website by the user. For example, in the case of the mining of cryptocurrency, the activity of the site may be different on account of different tasks being performed during the mining as compared with the activities performed during previous visits to the same website. For instance, during previous visits, the website may have contained news. Subsequently, the activity level may become higher while the content of the website did not change. Thus, the website might have been modified by hackers and mining of cryptocurrency may occur when the website is opened.

As a result of the analysis, in one aspect, the security application 210 uses the content of a website as attributes for detecting the unauthorized activity. For example, the security application 210 may use attributes such as, the website not allowing a page to be closed at once, the website having a specific advertising, the website accessing certain resources, and the like, to detect mining the cryptocurrency.

In one aspect, when the opening of the website using the browser 150 results in the execution of the script 160, the security application 210 requests as the attribute, from the cloud network based security service 220, the category of the website that is opened.

In one aspect, the security application 210 requests as the attribute, from the cloud network based security service 220, the category of the external server 280 from which the script 160 obtained the executed code. In one aspect, the executed code is obtained in BASE64 format.

Examples of the set of rules describing the attributes of messages used for the unapproved use are presented below.

"Rule 1"
If in the first 10 messages of a WSS or WS protocol there are discovered the following two sequences of bytes at the same time:
""job_id":"
""currentJob":",
then, this connection has been established by a script 160 which is mining cryptocurrency.

"Rule 2"
If in any of the messages of a WSS or WS protocol there are discovered the following three sequences of bytes at the same time:
""hextarget":"
""blob":"
""jsonrpc":"2.0", "method":"sign"",
and the IP address of the server is not known (e.g., server category is not determined), then, this connection has been established by a script 160 which is mining cryptocurrency.

"Rule 3"
If in any of the messages of a WSS or WS protocol there are discovered the following two sequences of bytes at the same time:
""job_id":"
""currentJob":", and the site whose opening in the browser 150 has resulted in the execution of the script 160 has a category of secure,
then, this connection has been established by a script 160 which is mining cryptocurrency, and the site has been infected (modified) by hackers.

"Rule 4"
If in any of the messages of a WSS or WS protocol there are discovered the following two sequences of bytes at the same time:
""hextarget":"
""blob":"
and also the site whose opening in the browser 150 has resulted in the execution of the script 160 blocks the closing by the user of the site page in the browser 150,
then, this connection has been established by a script 160 which is mining cryptocurrency, and the site has been created (modified) by hackers.

"Rule 5"
If in 10 messages of a WSS or WS protocol there are discovered the following two sequences of bytes at the same time:
""job_id":"
""currentJob":",
and a code obtained by the script 160 has the BASE64 format,
then, this connection has been established by a script 160 which is mining cryptocurrency.

In one aspect, the database 215 resides on the computing device of the user 150 and is replenished by the security application 210 by receiving updates from the cloud network based security service 220.

In one aspect, when the mining of cryptocurrency is detected, the security application 210 sends data about intercepted messages to the server 170 and to the cloud network based security service 220 for further categorization of previously unknown Internet resources. The categorization of previously unknown Internet resources may be performed in accordance with data categorization techniques ordinarily known in the relevant art, i.e., based on the application.

When the mining of cryptocurrency is not detected by the security application 210, the security application 210 additionally sends all the intercepted messages to the cloud network based security service 220. In turn, the cloud network based security service 220, using models of machine learning and data analysis methods, detects the mining of cryptocurrency on the computing device 190 of the user. In one aspect, the cloud network based security service 220 performs the data analysis using methods ordinary known in the relevant art, e.g., methods bases on Big Data Analysis schemes.

Figure 3:
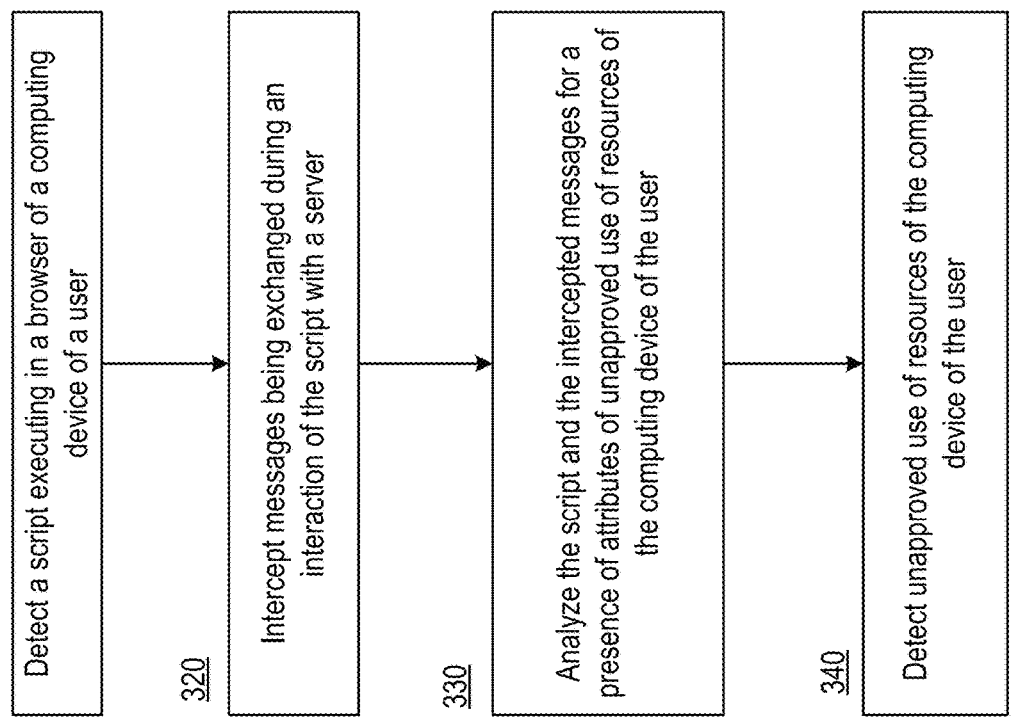
FIG. 3 illustrates an exemplary method for detecting an unapproved use of a computing device of a user, e.g., detecting mining cryptocurrency using a browser.

FIG. 3 illustrates an exemplary method 300 for detecting an unapproved use of a computing device of a user in accordance with aspects of the present disclosure. For example, the method 300 may be used for detecting mining of cryptocurrency using a browser software.

In step 310, method 300, by the security application 210, detects a script 160 executing in the browser 150.

In one aspect, the detection of the script 160 is performed by tracking the browser processes. in another aspect, the detection of the script 160 is performed by identifying other processes associated with such execution of the script in the browser 150.

In one aspect, the script 160 being executed in the browser 150 is detected using a plugin (software).

In step 320, method 300, by the security application 210, intercepts messages being exchanged during an interaction of the script 160 with a server 170, wherein the intercepted messages comprise at least one of messages sent from the script 160 to the server 170 and from the server 170 to the script 160. In one aspect, the intercepted messages comprise messages that are exchanged in accordance with a communication protocol over a TCP connection.

In step 330, method 300, by the security application 210, analyzes the intercepted messages to determine whether or not attributes of an unapproved use of resources of the computing device 190 of the user are present. The unapproved use of the resources of the computing device of the user 190 is a use of the resources of the computing device 190 by the script 160 without the consent of the user.

In one aspect, the unapproved use of the resources of the computing device of the user 190 comprises using, by the script 160, the resources of the computing device for mining of cryptocurrency.

In one aspect, the attribute of the unapproved use of the resources of the computing device of the user comprises at least one of:
  an attribute associated with the script 160 obtaining an obfuscated code;
  an attribute associated with the script 160 obtaining a code in a BASE64 format;
  an attribute based on a content of a website opened using the browser 150, wherein the opening of the websites resulted in the execution of the script 160;
  an attribute based on a predetermined sequence of bytes or strings being detected in the intercepted messages;
  an attribute based on a category of the external server 280 from which the script 160 received the obfuscated code; and
  an attribute based on a category of a website opened using the browser 150, wherein the opening of the website resulted in the execution of the script 160.

In one aspect, the category is obtained from the cloud network based security service 220.

In step 340, method 300, by the security application 210, detects the unapproved use of the resources of the computing device 190 of the user when at least one of said attributes is detected.

In one aspect, method 300 comprises analyzing, by the security application 210, the script 160, wherein the detection of the unapproved use of the resources is further based on the analysis of the script 160.

Figure 4:
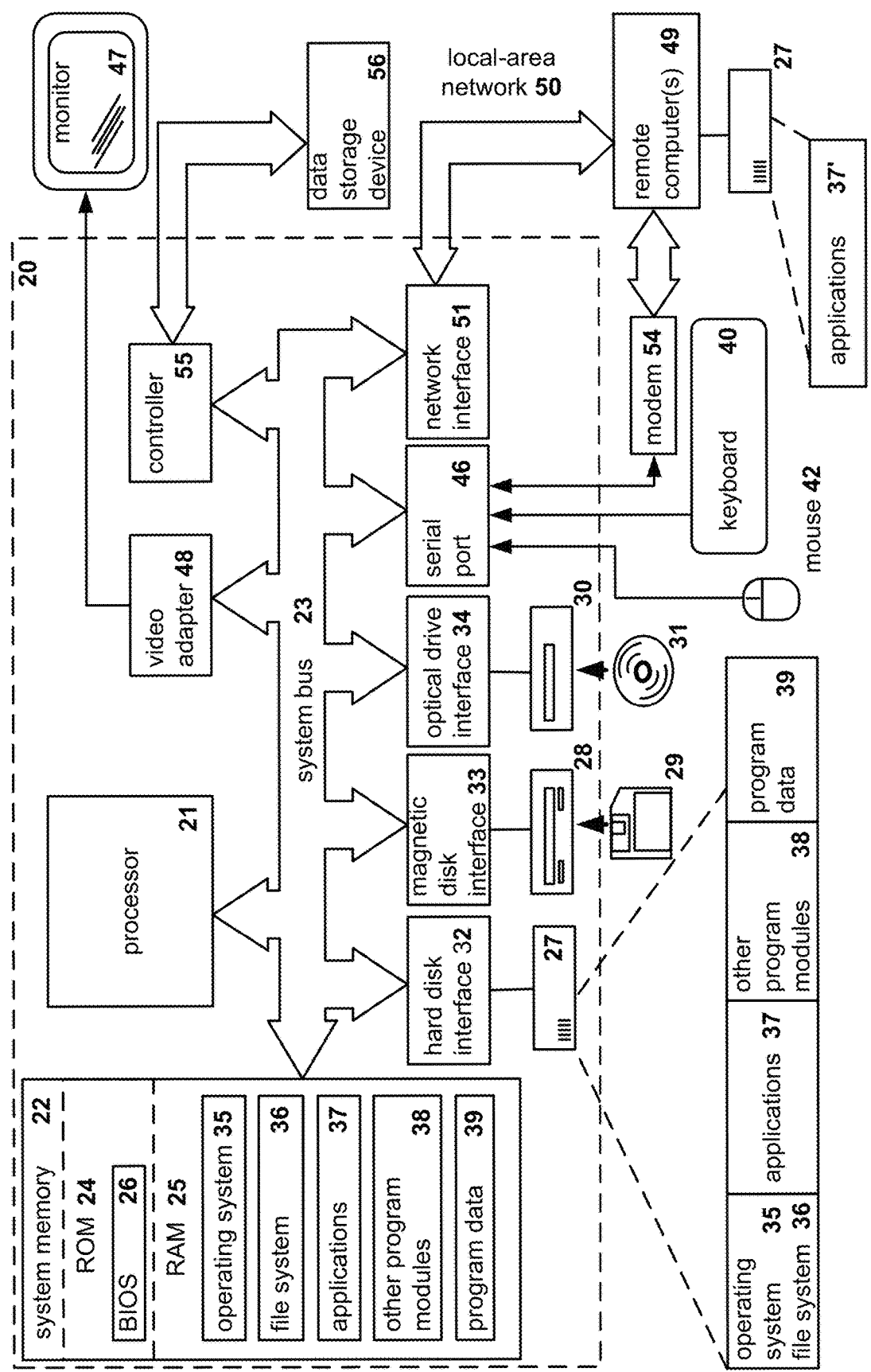
FIG. 4 presents an example of a general purpose computer system on which aspects of the present disclosure can be implemented.

FIG. 4 is a block diagram illustrating a computer system 20 on which aspects of systems and methods for detecting an unapproved use of a computing device of a user that may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting a mining of cryptocurrency using a computing device of a user, the method comprising:
   detecting, by a security application, a script executing in a browser on the computing device of the user;
   intercepting, by the security application, messages being exchanged during an interaction of the script with a server, wherein the intercepted messages comprise at least one of messages sent from the script to the server and from the server to the script, wherein the interaction of the script with the server is performed using a WebSocket (WS) or a WebSocket Secured (WSS) protocol;
   analyzing, by the security application, the intercepted messages to determine whether or not attributes of the mining of cryptocurrency using resources of the computing device of the user are present, wherein the attributes of the mining of the cryptocurrency comprise at least two sequences of bytes or strings being detected in the intercepted messages, wherein said sequences of bytes or strings include at least two of: '"hextarget":', '"blob":', and/or '"jsonrpc":"2.0", "method":"sign';

detecting, by the security application, the mining of cryptocurrency using the resources of the computing device of the user when said attributes are detected; and blocking, by the security application, sending of the intercepted messages and terminating connections between the computing device of the user and the server executing in the browser on the computing device of the user.

2. The method of claim 1, further comprising:
analyzing, by the security application, the script, wherein the detection of the mining of cryptocurrency is further based on the analysis of the script.

3. The method of claim 1, wherein the attributes further comprise at least one of:
an attribute associated with the script obtaining a code, the code being an obfuscated code;
an attribute associated with the script obtaining the code in a BASE64 format;
an attribute based on a content of a website opened using the browser, wherein the opening of the websites resulted in the execution of the script;
an attribute based on a category of an external server from which the script received the obfuscated code; and
an attribute based on a category of a web site opened using the browser, wherein the opening of the website resulted in the execution of the script.

4. The method of claim 1, wherein the script being executed in the browser is detected using a plugin.

5. The method of claim 1, wherein
the attributes indicating the mining of the cryptocurrency further include sequences of jsonrpc:2.0 and method: sign bytes in addition to the sequences of hextarget and blob bytes; and
detecting, by the security application, the mining of cryptocurrency using the resources of the computing device of the user when both of said sequences of attributes are detected and an IP address of the server is not known.

6. The method of claim 1, wherein
the attributes indicating the mining of the cryptocurrency include the sequences of hextarget and blob bytes; and
detecting, by the security application, the mining of cryptocurrency using the resources of the computing device of the user when said sequences of attributes a website, whose opening in the browser has resulted in the execution of the script, blocks the closing by the user of the website page in the browser.

7. A system for detecting a mining of cryptocurrency using a computing device of a user, comprising:
at least one hardware processor configured to:
detect, by a security application, a script executing in a browser on the computing device of the user;
intercept, by the security application, messages being exchanged during an interaction of the script with a server, wherein the intercepted messages comprise at least one of messages sent from the script to the server and from the server to the script, wherein the interaction of the script with the server is performed using a WebSocket (WS) or a WebSocket Secured (WSS) protocol;

analyze, by the security application, the intercepted messages to determine whether or not attributes of the mining of cryptocurrency using resources of the computing device of the user are present, wherein the attributes of the mining of the cryptocurrency comprise at least two sequences of bytes or strings being detected in the intercepted messages, wherein said sequences of bytes or strings include at least two of: '"hextarget":', '"blob":', and/or '"jsonrpc":"2.0", "method":"sign';

detect, by the security application, the mining of cryptocurrency using the resources of the computing device of the user when said attributes are detected; and block, by the security application, sending of the intercepted messages and terminate connections between the computing device of the user and the server executing in the browser on the computing device of the user.

8. The system of claim 7, wherein the hardware processor is further configured to:
analyze, by the security application, the script, wherein the detection of the mining of cryptocurrency is further based on the analysis of the script.

9. The system of claim 7, wherein the attributes further comprise at least one of:
an attribute associated with the script obtaining a code, the code being an obfuscated code;
an attribute associated with the script obtaining the code in a BASE64 format;
an attribute based on a content of a website opened using the browser, wherein the opening of the websites resulted in the execution of the script;
an attribute based on a category of an external server from which the script received the obfuscated code; and
an attribute based on a category of a web site opened using the browser, wherein the opening of the website resulted in the execution of the scripts.

10. The system of claim 7, wherein the script being executed in the browser is detected using a plugin.

11. The system of claim 7, wherein
the attributes indicating the mining of the cryptocurrency further include sequences of jsonrpc:2.0 and method: sign bytes in addition to the sequences of hextarget and blob bytes; and
detect, by the security application, the mining of cryptocurrency using the resources of the computing device of the user when both of said sequences of attributes are detected and an IP address of the server is not known.

12. The system of claim 7, wherein
the attributes indicating the mining of the cryptocurrency include the sequences of hextarget and blob bytes; and
detect, by the security application, the mining of cryptocurrency using the resources of the computing device of the user when said sequences of attributes a website, whose opening in the browser has resulted in the execution of the script, blocks the closing by the user of the website page in the browser.

13. A non-transitory computer readable medium storing thereon computer executable instructions for detecting a mining of cryptocurrency using a computing device of a user, including instructions for:
detecting, by a security application, a script executing in a browser on the computing device of the user;
intercepting, by the security application, messages being exchanged during an interaction of the script with a server, wherein the intercepted messages comprise at least one of messages sent from the script to the server and from the server to the script, wherein the interaction of the script with the server is performed using a WebSocket (WS) or a WebSocket Secured (WSS) protocol;

analyzing, by the security application, the intercepted messages to determine whether or not attributes of the mining of cryptocurrency using resources of the computing device of the user are present, wherein the attributes of the mining of the cryptocurrency comprise at least two sequences of bytes or strings being detected in the intercepted messages, wherein said sequences of bytes or strings include at least two of: '"hextarget":', '"blob":', and/or '"jsonrpc":"2.0", "method":"sign';

detecting, by the security application, the mining of cryptocurrency using the resources of the computing device of the user when said attributes are detected; and blocking, by the security application, sending of the intercepted messages and terminating connections between the computing device of the user and the server executing in the browser on the computing device of the user.

14. The non-transitory computer readable medium of claim 13, the instructions further comprising instructions for:

analyzing, by the security application, the script, wherein the detection of the mining of cryptocurrency is further based on the analysis of the script.

15. The non-transitory computer readable medium of claim 13, wherein the attributes further comprise at least one of:

an attribute associated with the script obtaining a code, the code being an obfuscated code;

an attribute associated with the script obtaining the code in a BASE64 format;

an attribute based on a content of a website opened using the browser, wherein the opening of the websites resulted in the execution of the script;

an attribute based on a category of an external server from which the script received the obfuscated code; and an attribute based on a category of a web site opened using the browser, wherein the opening of the website resulted in the execution of the script.

16. The non-transitory computer readable medium of claim 13, wherein the script being executed in the browser is detected using a plugin.

* * * * *